(12) United States Patent
Jo (10) Patent No.: US 12,090,693 B2
(45) Date of Patent: Sep. 17, 2024

(54) CO-INJECTION MOLDING APPARATUS, METHOD FOR CONTROLLING SAME, AND INJECTION PRODUCT BY CO-INJECTION MOLDING

(71) Applicant: LG ELECTRONICS INC., Seoul (KR)

(72) Inventor: Eunsu Jo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 436 days.

(21) Appl. No.: 17/408,957

(22) Filed: Aug. 23, 2021

(65) Prior Publication Data
US 2022/0063157 A1 Mar. 3, 2022

(30) Foreign Application Priority Data

Sep. 1, 2020 (KR) .................. 10-2020-0111350

(51) Int. Cl.
*B29C 45/22* (2006.01)
*B29C 45/17* (2006.01)
*B29C 45/18* (2006.01)

(52) U.S. Cl.
CPC .......... *B29C 45/22* (2013.01); *B29C 45/1704* (2013.01); *B29C 45/1866* (2013.01)

(58) Field of Classification Search
None
See application file for complete search history.

(56) References Cited

U.S. PATENT DOCUMENTS 4,805,991 A 2/1989 Arai et al.
2017/0312961 A1 11/2017 Mühlemann

FOREIGN PATENT DOCUMENTS

| JP | S 63139718 A | 6/1988 |
| JP | H 05192961 A | 8/1993 |
| JP | H 08118418 A | 5/1996 |
| KR | 10-2017-0083057 | 7/2017 |
| WO | WO 03/031142 | 4/2003 |
| WO | WO 2007-138186 A2 | 12/2007 |

OTHER PUBLICATIONS

Korean Office Action dated Dec. 27, 2021 issued in KR Application No. 10-2020-0111350.
Korean Notice of Allowance dated Jan. 3, 2023 issued in Application 10-2020-0111350.

*Primary Examiner* — Jacob T Minskey
*Assistant Examiner* — Adrianna N Konves
(74) *Attorney, Agent, or Firm* — KED & Associates LLP (57) ABSTRACT

A co-injection molding apparatus may mold an injection product that includes a skin layer forming an outer surface by a first material and a core layer surrounded by the skin layer and having an interior formed by a second material. The co-injection molding apparatus may include an injection mold configured to form an injection space to be injection molded by the first material and the second material, a first injector configured to inject the first material, a second injector configured to inject the second material different from the first material and positioned between the first injector and the injection mold, and a runner configured to connect the first injector, the second injector, and the injection mold.

14 Claims, 6 Drawing Sheets

CO-INJECTION MOLDING APPARATUS, METHOD FOR CONTROLLING SAME, AND INJECTION PRODUCT BY CO-INJECTION MOLDING

CROSS-REFERENCE TO RELATED APPLICATION

This application claims priority under 35 U.S.C. § 119 to Korean Application No. 10-2020-0111350 filed on Sep. 1, 2020, whose entire disclosure is hereby incorporated by reference.

BACKGROUND

1. Field

The present disclosure relates to a co-injection molding apparatus, a method for controlling the same, and an injection product by co-injection molding.

2. Background

A co-injection method can mold injection products having different double structures inside and outside through sequential injection of dissimilar materials. According to the pair of dissimilar materials, the injected product may be stiffened or the plating and paintability of the injected product may be improved.

In Korean Patent Application Laid-Open No. 10-2017-0083057, which is a prior document, a co-injection nozzle including an integrated backflow barrier is disclosed. In this prior document, two flow paths are included in one valve to implement co-injection through control of the valve pin, and since temperature control of different materials is performed through one heater provided in one valve, there is a problem that the two materials to have the same melting point as each other. In addition, in the case of the prior document, separate servomotor controller equipment is required for precise control of the valve pin, and a high investment cost may be required.

BRIEF DESCRIPTION OF THE DRAWINGS

The embodiments will be described in detail with reference to the following drawings in which like reference numerals refer to like elements wherein.

DETAILED DESCRIPTION

Figure 1:
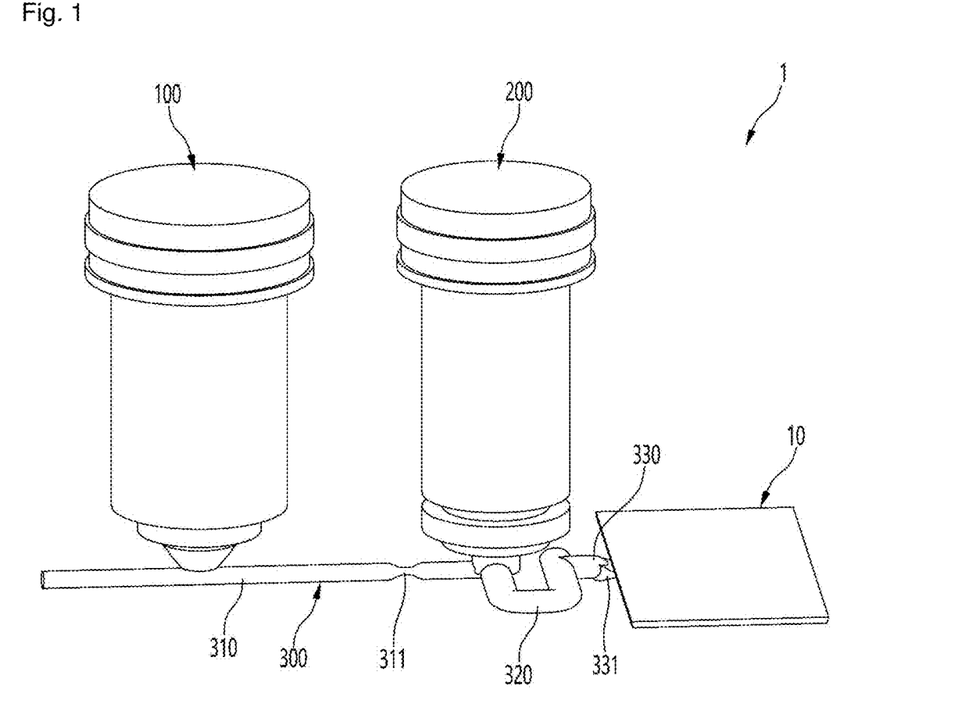
FIG. 1 is a conceptual diagram illustrating a co-injection molding apparatus according to an embodiment of the present disclosure.
Figure 5:
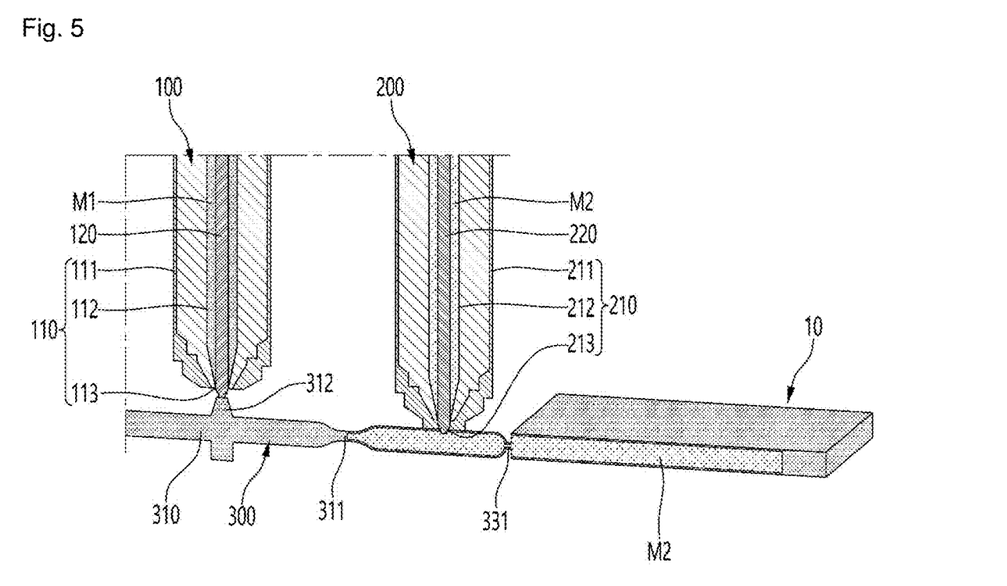
Figure 6:
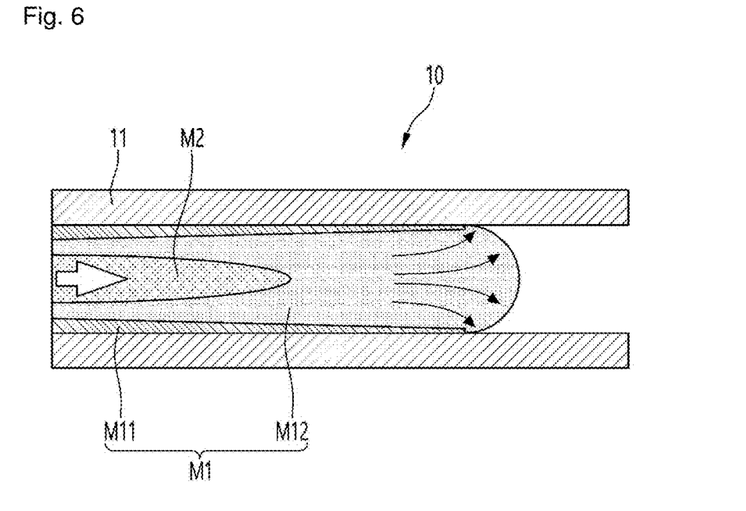
FIG. 6 is a view illustrating the flow of raw materials during operation of the co-injection molding apparatus according to an embodiment of the present disclosure.

FIG. 1 is a conceptual diagram illustrating a co-injection molding apparatus according to an embodiment of the present disclosure. FIGS. 2 to 5 are views illustrating the operation of the co-injection molding apparatus according to an embodiment of the present disclosure. FIG. 6 is a view illustrating the flow of raw materials during operation of the co-injection molding apparatus according to an embodiment of the present disclosure.

The co-injection molding apparatus 1 of the present disclosure may include injectors 100 and 200 for receiving raw material, and a runner 300 to be disposed between the injectors 100 and 200 and the injection mold 10. The co-injection molding apparatus 1 may be an apparatus for injection molding a skin layer 21 and a core layer 22 of the injection product 20 with different materials.

The skin layer 21 is a layer forming the outer surface of the injection product 20 (refer to FIG. 8), and the core layer 22 may be a layer that is surrounded by the skin layer 21 to form the inside of the injection product 20. When the inner and outer layers are formed of different materials, the outer layer may be formed of an expensive material for aesthetics of the outer appearance, and the inner layer may be formed of a relatively inexpensive material, and thus both cost reduction and aesthetics of the outer appearance can be secured.

The skin layer 21 may be formed of a first material M1, and the core layer 22 may be formed of a second material M2 different from the first material M1. For example, the first material M1 may be an ABS resin for plating, and the second material M2 may be a high-strength resin for durability. As another example, the first material M1 may be pearl resin including metal powder, and the second material M2 may be a general resin. As another example, the first material M1 may be new material, and the second material M2 may be a recycled material.

In order to mold the inner and outer layers of different materials by injection molding, in the past, there are problems that a complicated control method is used, or the cost of the injection molding apparatus is excessive.

The co-injection molding apparatus 1 of this embodiment may present an apparatus capable of performing co-injection molding by utilizing an existing injector. The co-injection molding apparatus 1 may include separate injectors 100 and 200 for receiving two materials forming the inner and outer layers, respectively.

The injectors 100 and 200 may include a first injector 100 which receives the first material M1, and a second injector 200 which is connected in parallel with the first material 100 and receives a second material M2.

The second injector 200 may be disposed closer to the injection mold 10 (for injection molding) than the first injector 100. The first injector 100 may receive the first material M1 and inject the first material M1 into the runner 300 (or to the runner).

The first injector 100 may include a first nozzle part 110 which receives the first material M1, and a first valve pin 120 that controls the injection of the first material M1 into the runner 300. For example, the first nozzle part 110 may include a first main body 111 forming an outer appearance of the first nozzle part 110, and a first receiving part 112 which is a space receiving the first material M1. The first nozzle part 110 may include a first inlet 113 which is a portion in which the first receiving part 112 is to contact the runner 300.

In the first main body 111, a heater may be disposed to prevent the first material M1 from being solidified, and the first receiving part 112 can be disposed inside the heater. The first material M1 may be maintained in a molten state through the heater, and the heater may be controlled such that the first material M1 is maintained at a melting temperature or higher. For example, the first main body 111 may be connected to a first supply part to which the first material M1 is supplied and may be formed to extend in the vertical direction. Accordingly, the first material M1 may be supplied to the runner 300 by gravity.

The first receiving part 112 may extend in the vertical direction inside the first main body 111, and the first receiving part 112 may be provided with the first valve pin 120 having a smaller diameter than that of the first receiving part 112.

The first valve pin 120 may open and close the first inlet 113 through vertical movement of the first valve pin 120. In other words, when the first valve pin 120 is moved upward, the first inlet 113 is opened so that the first material M1 can be injected into the runner 300 (or to the runner 300), and when the first valve pin 120 moves downward to close the first inlet 113, the injection of the first material M1 into the runner 300 may be stopped.

The amount and time of supplying the first material M1 to the runner 300 may be controlled through the vertical movement of the first valve pin 120. The lower end part of the first valve pin 120 may be greater than or equal to the size of the first inlet 113.

The structure of the second injector 200 may also be the same as that of the first injector 100. Accordingly, portions with differences may be mainly described below.

The second injector 200 may receive the second material M2 and inject the second material M2 into the runner 300 (or to the runner 300). The second injector 200 may include a second nozzle part 210 for receiving the second material M2 and a second valve pin 220 which controls the injection of the second material M2 into the runner. For example, the second nozzle part 210 may include a second main body 211 forming an outer appearance of the second nozzle part 210, and a second receiving part 212a which is a space for receiving the second material M2. The second nozzle part 210 may further include a second inlet 213 which is a portion in which the second receiving part 212 is to contact the runner 300.

In the second main body 211, a heater may be disposed to prevent the second material M2 from solidifying, and the second receiving part 212 may be disposed inside the heater. The second material M2 may be maintained in a molten state through the heater, and the heater may be controlled such that the second material M2 is maintained at a melting temperature or higher.

The heater may be disposed in the first injector 100 and the second injector 200, respectively, to control the temperatures of the first material M1 and the second material M2. Accordingly, injection molding can be performed using the first material M1, and the second material M2 having different melting temperatures. For example, the melting temperature of the first material M1 may be lower than or equal to the melting temperature of the second material M2.

The second inlet 213 may be in contact with the outer surface of the runner 300.

The materials injected from the injectors 100 and 200 are fed into the runner 300 (or to the runner 300) and solidified while the temperature is lowered on the surface at the same time. Accordingly, solidification proceeds from the surface of the runner 300, and as the second injector 200 is disposed closer to the injection mold 10 than the first injector 100, the first material M1 may be solidified at the inlet of the second injector 200.

For co-injection molding, the injection of the first material M1 may precede the injection of the second material M2. When the first material M1 is solidified in the runner on the inlet side of the second injector 200, there may be a problem that the second material M2 may not be injected. In order to solve this problem, a part of the second valve pin 220 of the second injector 200 may be inserted into the runner 300 (or to the runner 300).

The second inlet 213 may be in contact with the outer surface of the runner 300, and the second valve pin 220 may further extend below the second inlet 213 and thus a part of the second valve pin 220 may be inserted into the runner 300 (or to the runner 300). For example, the second valve pin 220 may include an insertion part 221 inserted into the runner 300, and an extension part 222 extending upwardly of the insertion part 221. The diameter of the insertion part 221 may be smaller than the diameter of the extension part 222. A diameter of the second inlet 213 may be greater than the diameter of the insertion part 221 and smaller than the diameter of the extension part 222. The length of the second valve pin 220 may be greater than the length of the first valve pin 210.

The runner 300 may be connected to the first injector 100 and the second injector 200, and the injection mold 10 may be connected to an end part of the runner 300.

The runner 300 may include a runner main body 310 to which the first injector 100 and the second injector 100 are connected. The runner main body 310 may extend in a direction intersecting the direction in which the first injector 100 and the second injector 200 extend, and the first inlet 113 of the first injector 100 and the second inlet 213 of the second injector 200 may be in contact with the runner main body 310.

The runner main body 310 may include a first injector connection part 312 for being connected to the first injector 100. The connection part 312 may extend toward the first injector 100 in order to be connected to the first injector 100. Accordingly, it is possible to prevent the first injector 100 and the runner 300 from interfering with each other.

The runner 300 may be provided with a backflow prevention part 311 for preventing backflow between the portion connected to the first injector 100 and the portion connected to the second injector 200.

Since the first material M1 injected from the first injector 100 and the second material M2 injected from the second injector 200 must flow toward the injection mold 10, it may be necessary to prevent the second material M2 (injected from the second injector 200) from flowing toward the first injector 100. The backflow prevention part 311 may have a smaller diameter than the diameter of the runner main body 310. The diameter of the backflow prevention part 311 may be smaller than the diameter of a gate 331 to be described later. In other words, as the diameter of the backflow prevention part 311 is formed to be the smallest and solidification proceeds rapidly, the second material M2 (injected from the second injector 200) can be prevented from flowing toward the first injector 100.

The size of an exposed hole 23 to be described later in the finally molded injection product 20 is determined by the size of the gate 331. At this time, since the smaller the size of the exposed hole 23, the better aesthetics of the appearance, the size of the gate 331 may be smaller than the size of the runner main body 310. In other words, the size of the backflow prevention part 311, the gate 331, and the runner main body 310 may increase in the order of the backflow prevention part 311, the gate 331, and the runner main body 310.

The runner 300 may include a solidification prevention slot 313 into which the second valve pin 220 is inserted. As described above, as a portion of the second valve pin 220 is inserted into the solidification prevention slot 313, the solidification of the first material M1 at the inlet side of the second injection molding 200 can be prevented.

The runner 300 may include a gate 331 in which the runner 300 and the injection mold 10 are in contact with each other and may include a bypass runner 320 between the gate 331 and the solidification prevention slot 313. The bypass runner 320 may serve to increase the retention amount so that the first material M1 is sufficiently injected and solidified in the surface layer before the second material M2 is injected. As the amount of the first material M1 remaining in the bypass runner 320 increases, the formation of the skin layer 21 of the injection product 20 may be easier. For example, the bypass runner 320 may be formed in a U-shape, and the volume of the bypass runner 320 may be equal to the volume of the skin layer 21 formed by the first material M1 in the injection mold 10. The bypass runner 320 may include at least one bend.

The runner 300 may further include a connection part 330 connecting the bypass runner 320 and the injection mold 10 to each other. The connection part 330 may include a gate 331 in contact with the injection mold 10.

With reference to FIGS. 1 to 6, a method for performing co-injection molding using the co-injection molding apparatus 1 will be described.

Figure 2:
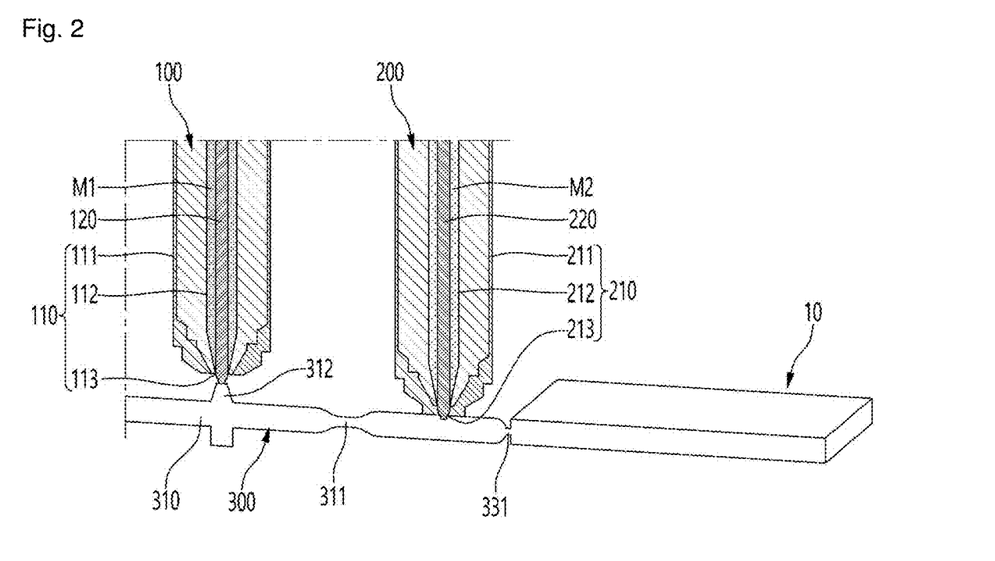
FIGS. 2 to 5 are views illustrating the operation of the co-injection molding apparatus according to an embodiment of the present disclosure.
Figure 3:
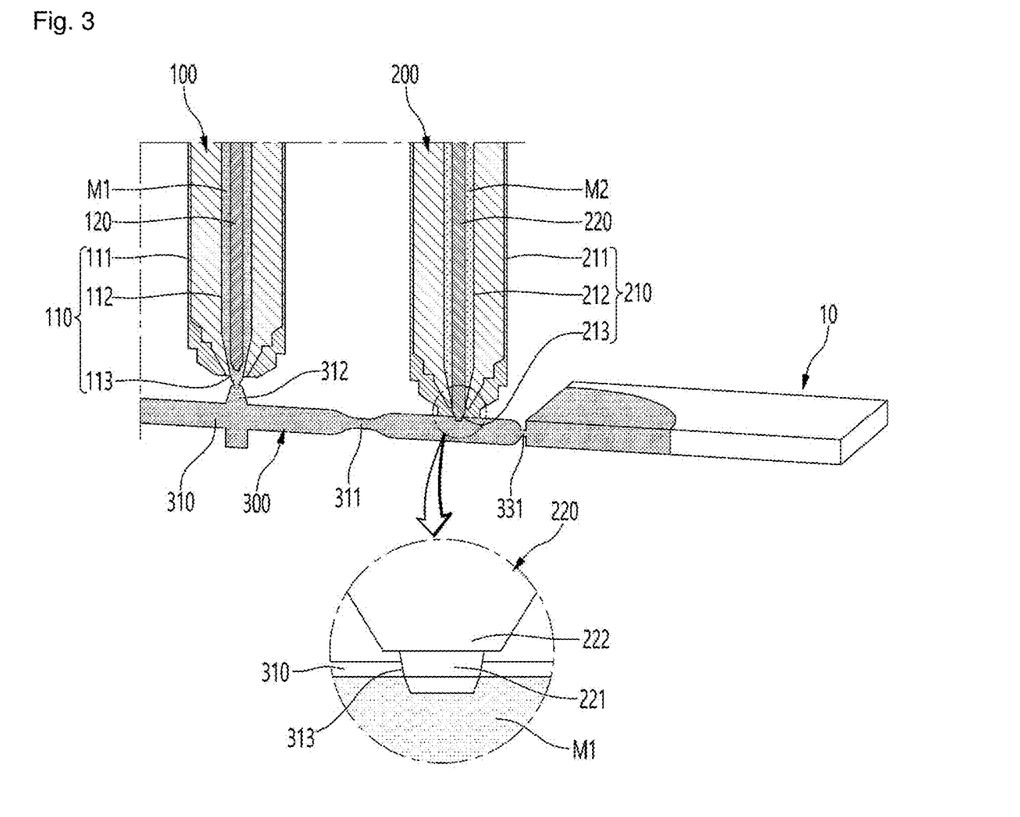

FIG. 2 is a view illustrating a step before injection molding proceeds. Both the first valve pin 120 of the first injector 100 and the second valve pin 220 of the second injector 200 move downwards to close inlets of both the first injector 100 and the second injector 200. FIG. 3 is a view illustrating a step in which the first material M1 is being injected only in the first injector 100 preferentially.

The first valve pin 120 of the first injector 100 moves upward so that the first inlet 113 is in a state of being opened, and the second inlet 213 of the second injector 200 is still in a state of being closed. The first material M1 injected into the runner 300 may flow along the runner main body 310 to flow into the injection mold 10. The first material M1 is first injected into the injection mold 10, and the temperature of the portion in contact with the surface of the injection mold 10 is lowered, so that solidification of the first material M1 may preferentially proceed.

The solidification of the first material M1 may also proceed along the surface of the runner main body 310, and at this time, a portion of the second valve pin 220 is inserted into the runner 300, and thus the solidification of the first material M1 may not proceed in the vicinity of the solidification prevention slot 313. Additionally, the first material M1 may be retained in the bypass runner 320.

Figure 4:
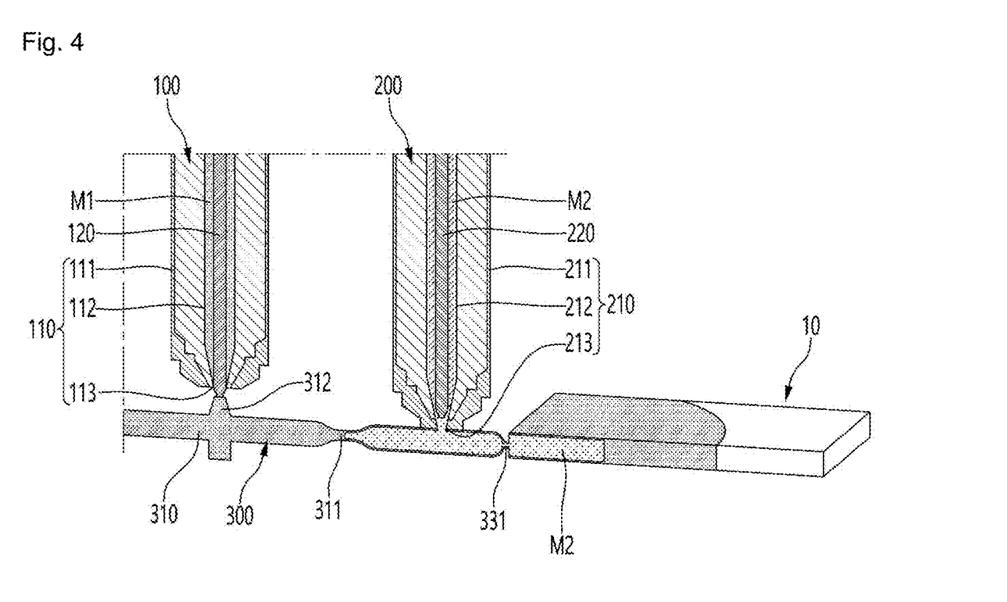

FIG. 4 is a view illustrating a step of injecting the second material M2 from the second injector 200 to the runner 300 after a predetermined time has elapsed since the first material M1 has been injected. In a state where the first material M1 from the first injector 100 is still being injected into the runner 300, the second valve pin 220 may move upward to start injection of the second material M2.

As shown in FIG. 6, the temperature of the surface part M11 of the first material M1 in contact with the runner 300 and the surface 11 of the injection mold 10 may decrease so that the surface part M11 of the first material M1 may be in a solidified state. The inner layer M12 of the first material M1 that is not in contact with the runner 300 and the surface of the injection mold 10 may be in a state where the temperature thereof has not yet decreased and thus is not solidified.

At this time, when the second material M2 is injected from the second injector 200, the second material M2 may be injected into the non-solidified inner layer M12 according to characteristics of laminar flow and fractional flow and flow together.

In other words, when the first material M1 flows and then stops while the surface part M11 is solidified, the inner layer M12 continues to flow, and according to the flow of the inner layer M12, the solidification may proceed as the second material M2 flows together in the inner layer M12.

According to the laminar flow and fractional flow characteristics of the first material M1 and the second material M2, molding is performed without mixing between dissimilar materials, and the last section of the injection product 20 may be molded by the second material M2 which is introduced later. The last section of the injection product 20 may be an exposed hole 23 to be described below.

When the first material M1 and the second material M2 are continuously injected in this way and thus the two materials are injected into the injection mold 10, injection molding may be completed. When the injection molding is completed, as shown in FIG. 5, the first valve pin 120 of the first injector 100 and the second valve pin 220 of the second injector 200 may both move downward and thus the inlet of each injector may be blocked.

Figure 7:
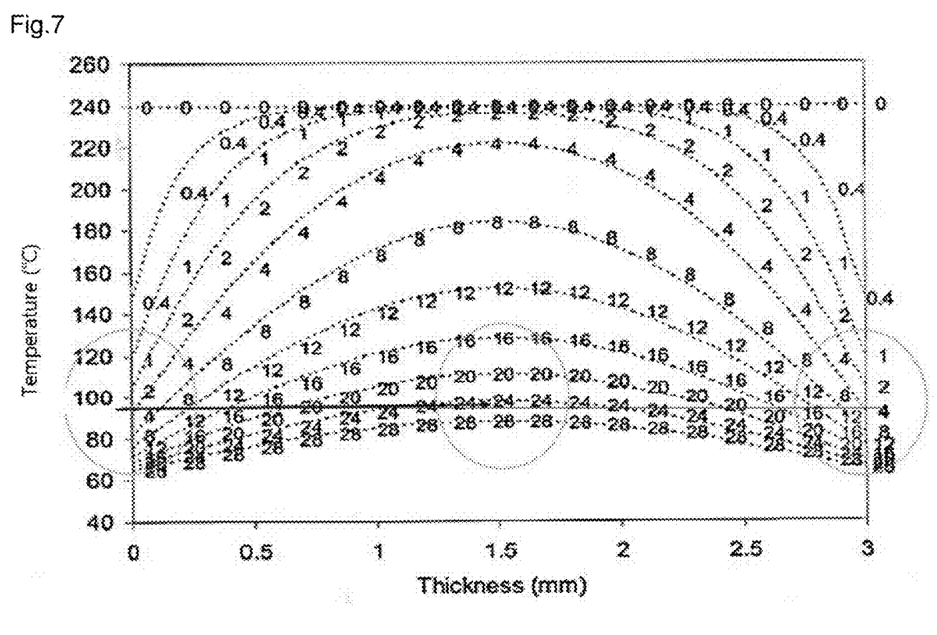
FIG. 7 is a cooling time curve graph according to the thickness of an injection product according to an embodiment of the present disclosure.

FIG. 7 is a cooling time curve graph according to thickness of the injection molding according to an embodiment of the present disclosure. In order for the second material M2 to be uniformly injected into the interior of the first material M1, the speed and pressure at which the second material M2 is injected and the delay time until the second material M2 is injected after the first material M1 is injected may be controlled.

When the first material M1 is injected into the injection mold 10, a solidified layer is formed within a short time, which can be determined according to the thickness of the injection product 20 formed by the injection mold 10. The time until the surface layer M11 of the first material M1 is formed can be determined according to the cooling time curve graph shown in FIG. 7. Accordingly, the injection rate, pressure, and delay time of the second material M2 can be determined. For example, if the thickness of the injection product 20 is 3t, the time for the surface of the skin layer to fall 100° C. or less is 2 seconds, and the time for the 1.5t region, which is the center, to fall 100° C. or less may be 24 seconds.

Accordingly, after the first material M1 is injected, the second material M2 may be injected for a delay time of from 2 seconds to 24 seconds. Additionally, as the injection speed and pressure of the second material M2 increase, the area of the injection product penetrating the core layer may increase.

Figure 8:
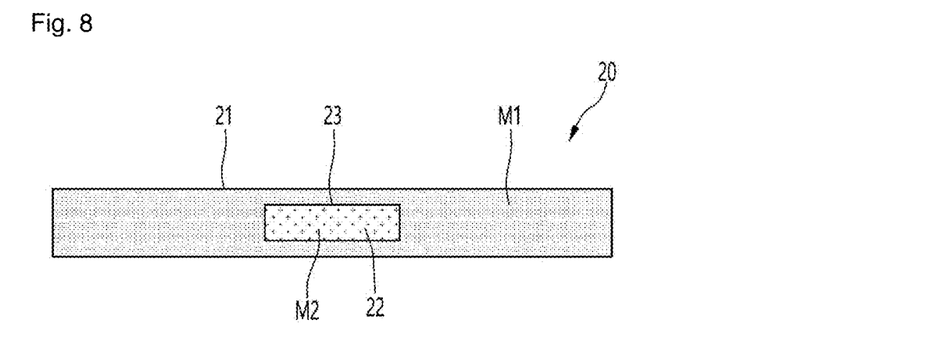
FIG. 8 is a view illustrating a state of being viewed from one side of the injection product according to an embodiment of the present disclosure.

FIG. 8 is a view illustrating a state of being viewed from one side of the injection product after molding is completed.

In the co-injection molding apparatus 1 according to this embodiment, since materials are injected through the gate 331, the injection product 20 may be formed with the exposed hole 23 through which the second material M2 forming the core layer 22 on a part of the skin layer 21 is exposed. For example, the size of the exposed hole 23 may be the same as the size of the gate 331.

The primarily finished injection product may include an injection product main body and a runner shape. The primarily completed injection product may include a first runner portion from the first injector 100 to the second injector 200, which is formed only of the first material M1, a second runner portion formed of the first material M1 and the second material M2, and the injection product main body.

The first runner portion may include a portion molded to correspond to the backflow prevention part 311. The second runner portion may correspond to a runner from the portion where the second injector 200 and the runner 300 are connected to the gate 331, and may include a portion molded as a shape corresponding to the bypass runner 320. The primary finished injection product may include a first runner portion including a shape corresponding to the backflow prevention part 311, a second runner portion including a shape corresponding to the bypass runner 320, and an injection product main body. Thereafter, only the injection product main body may be cut through processing, and thus, the exposed hole 23 may be formed in the cut portion.

Figure 9:
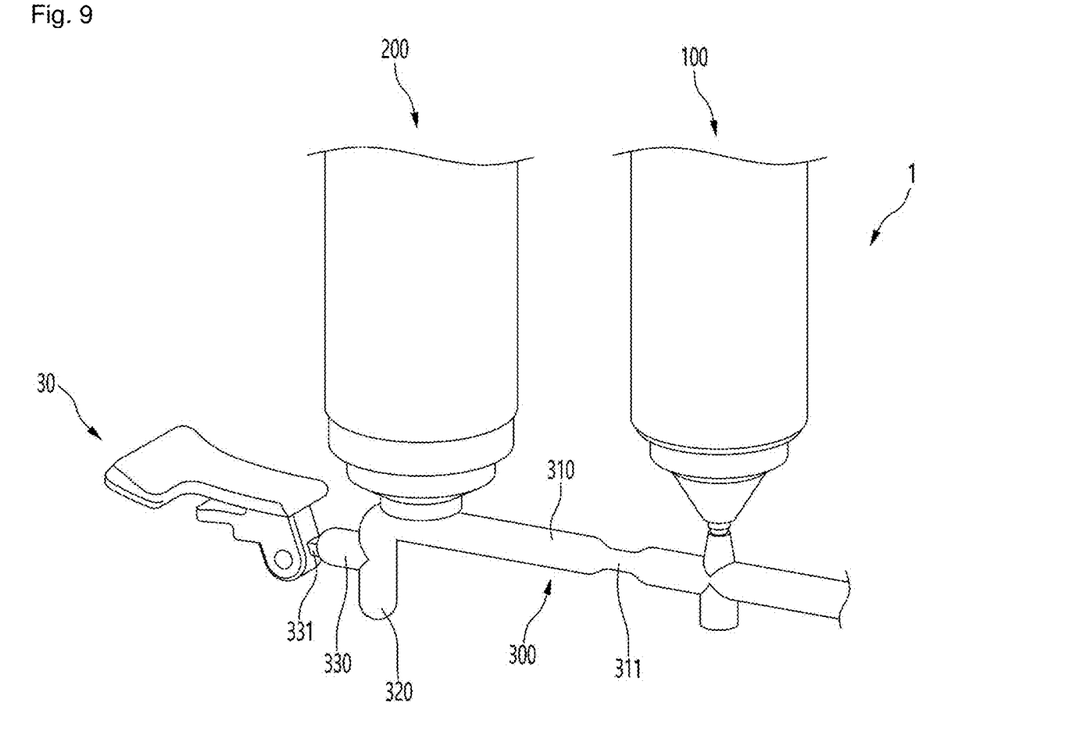
FIG. 9 is a conceptual diagram illustrating a co-injection molding apparatus according to another embodiment of the present disclosure.
Figure 10:
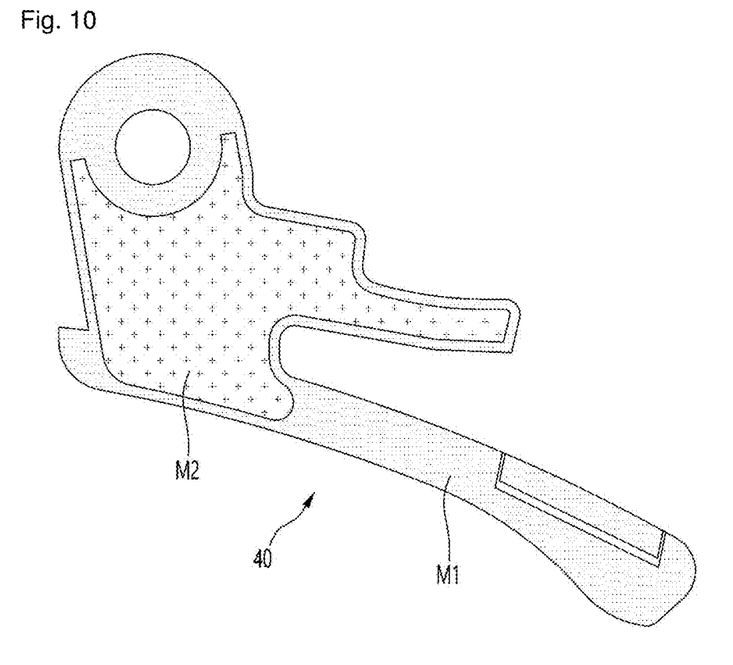
FIG. 10 is a cross-sectional view illustrating an injection product according to another embodiment of the present disclosure.

FIG. 9 is a conceptual diagram illustrating a co-injection molding apparatus according to another embodiment of the present disclosure. FIG. 10 is a cross-sectional view illustrating an injection product according to another embodiment of the present disclosure. FIGS. 9 and 10 show the co-injection molding apparatus 1 and an injection product 40 (formed by an injection mold 30) according to another embodiment. The injection product 40 may be changed according to the shape of the injection mold 30, and the bypass runner 320 of the runner 300 may be formed according to the shape of the injection mold 30.

As shown in FIG. 9, the bypass runner 320 may extend from a portion connected to the second injector 200 toward the injection mold 30, and a gate 331 may be formed on a bent portion formed by bending the bypass runner one time or more. As shown in FIG. 10, in the injection product 40, the first material M1 may form a skin layer, and the second material M2 may form a core layer. For example, the first material M1 may be an ABS material for plating, and the second material M2 may be a high-strength PA6+GF30% material.

The present embodiment may provide a co-injection molding apparatus capable of dividing a skin layer and a core layer and injection molding the skin layer and the core layer into different materials, and a method for controlling the same.

The present embodiment may provide a co-injection molding apparatus capable of performing co-injection molding using two materials having different melting points, and a method for controlling the same.

The co-injection molding apparatus according to one aspect may perform injection molding through a plurality of injectors for injection molding in which the skin layer and the core layer are formed of different materials. By allowing the two materials to be fused after being inserted into the runner, the co-injection molding apparatus has an advantage of being able to control the two materials at different temperatures.

The co-injection molding apparatus according to an embodiment of the present disclosure can mold an injection product including a skin layer forming an outer surface by a first material and a core layer surrounded by the skin layer and forming inside by a second material.

A co-injection molding apparatus may include an injection mold configured to form an injection space to be injection molded by the first material and the second material, a first injector configured to inject the first material, a second injector configured to inject the second material different from the first material and positioned between the first injector and the injection mold, and a runner configured to connect the first injector, the second injector, and the injection mold.

After the first material is injected, a predetermined time may elapse, and then the second material may be injected.

The second injector may include a valve pin partly inserted into the runner.

After the first material is injected and before the second material is injected, the valve pin may be in a state of being inserted into the runner.

The runner may include a solidification prevention slot into which a part of the valve pin of the second injector is inserted.

In a case where only the first material is being injected, the valve pin of the second injector may be inserted into the solidification prevention slot so that the first material around the solidification prevention slot is in a state of being molten.

The valve pin of the second injector may include an insertion part inserted into the solidification prevention slot and an extension part configured to extend upwardly of the insertion part, and the diameter of the extension part may be larger than the diameter of the insertion part.

The runner may include a runner main body connected to the first injector and the second injector, and a connection part connected to the injection mold, and the runner may include a bypass runner bent one time or more between the runner main body and the connection part.

The volume of the bypass runner may be the same as the volume of the skin layer of the injection product.

The runner may include a first injector connection part protruding in a direction intersecting an extension direction of the runner main body to be connected to the first injector.

The runner may include a backflow prevention part which is disposed between the first injector and the second injector and has a diameter smaller than the diameter of the runner main body.

The runner may include a gate connected to the injection mold, and the diameter of the backflow prevention part may be smaller than the diameter of the gate.

The injection product separated from the co-injection molding device may include a first runner portion including a molded part corresponding to the backflow prevention part, a second runner portion including a molded part corresponding to the bypass runner, and an injection product main body including a shape of an injection product formed of the skin layer and the core layer.

The melting temperature of the first material may be equal to or less than the melting temperature of the second material.

A method for controlling a co-injection molding apparatus including a first injector and a second injector may include a step of injecting a first material into a runner by the first injector, and a step of injecting a second material into the runner by the second injector after a predetermined time has elapsed from the time the first material is injected into the runner.

In the step of injecting the first material into the runner, the valve pin of the first injector may be in a state of being moved upward so that an inlet of the first injector is opened, and the valve pin of the second injector may be in a state of being partially inserted into the runner.

In the step of injecting the second material into the runner, the valve pin of the second injector may be in a state of being moved upward so that an inlet of the second injector is opened.

The first material and the second material may flow toward an injection mold having an injection space for forming an injection product and connected to the runner.

The first material and the second material may be maintained at different temperatures from each other.

In addition, an injection product according to an embodiment of the present disclosure may include a skin layer made of a first material and forming an outer surface, a core layer located inside the skin layer and made of a second material different from the first material, and an exposed layer in which the second material is exposed to a part of the skin layer.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A co-injection molding apparatus to mold an injection product that includes a skin layer to form an outer surface and a core layer having an interior to be surrounded by the skin layer, the skin layer to be formed by a first material, and the core layer to be formed by a second material, the co-injection molding apparatus comprising:
    an injection mold configured to be injection molded by the first material and the second material, and to provide the injection product;
    a runner configured to provide the first material and the second material to the injection mold;
    a first injector configured to inject the first material to the runner;
    a second injector configured to inject the second material, different from the first material, to the runner and the second injector provided between the first injector and the injection mold,
    wherein the runner includes:
        a runner main body configured to connect to the first injector and to the second injector,
        a bypass runner configured to connect the second injector and the injection mold, and including at least one bend so as to increase a retention amount of the first material, and
        a backflow prevention part formed on the runner main body between the first injector and the second injector, and having a diameter smaller than a diameter of the runner main body.

2. The co-injection molding apparatus of claim 1,
wherein, after the first injector injects the first material to the runner, a predetermined time elapses, and then the second injector is to inject the second material to the runner.

3. The co-injection molding apparatus of claim 2,
wherein the second injector includes a valve pin to be partly inserted into the runner.

4. The co-injection molding apparatus of claim 3,
wherein after the first injector injects the first material to the runner and before the second injector injects the second material to the runner, the valve pin is to be inserted into the runner.

5. The co-injection molding apparatus of claim 3,
wherein the runner includes a solidification prevention slot configured to receive a part of the valve pin.

6. The co-injection molding apparatus of claim 5,
wherein when only the first material is being injected to the runner, the valve pin is inserted into the solidification prevention slot such that the first material around the solidification prevention slot is in a molten state.

7. The co-injection molding apparatus of claim 6,
wherein the valve pin includes an insertion part configured to be inserted into the solidification prevention slot and an extension part configured to extend upwardly from the insertion part, and
wherein a diameter of the extension part is larger than a diameter of the insertion part.

8. The co-injection molding apparatus of claim 1, wherein the runner further includes
a connection part configured to connect to the injection mold.

9. The co-injection molding apparatus of claim 8,
wherein a volume of the bypass runner is the same as a volume of the skin layer of the injection product.

10. The co-injection molding apparatus of claim 8,
wherein the runner includes:
a first injector connection part configured to connect to the first injector by protruding from the runner main body in a direction transverse to an extension direction of the runner main body.

11. The co-injection molding apparatus of claim 8,
wherein the runner includes:
a gate to connect to the injection mold, and
wherein a diameter of the backflow prevention part is smaller than a diameter of the gate.

12. The co-injection molding apparatus of claim 8,
wherein the injection product includes:
a first runner portion including a first molded part corresponding to the backflow prevention part,
a second runner portion including a second molded part corresponding to the bypass runner, and
an injection product main body having a shape of the injection product formed of the skin layer and the core layer.

13. The co-injection molding apparatus of claim 1,
wherein a melting temperature of the first material is equal to or less than a melting temperature of the second material.

14. The co-injection molding apparatus of claim 8,
wherein the runner further includes:
an injector connector configured to connect to the first injector,
a slot configured to receive part of the second injector, and
a gate configured to contact the injection mold,
wherein the backflow prevention part is disposed between the injector connector of the runner and the slot of the runner, and
the bypass runner is disposed between the slot of the runner and the gate, such that the bypass runner is disposed between the backflow prevention part and the injection mold.

* * * * *